(No Model.)                    2 Sheets—Sheet 1.
J. C. McQUILKIN.
NUT LOCK.
No. 481,417.        Patented Aug. 23, 1892.
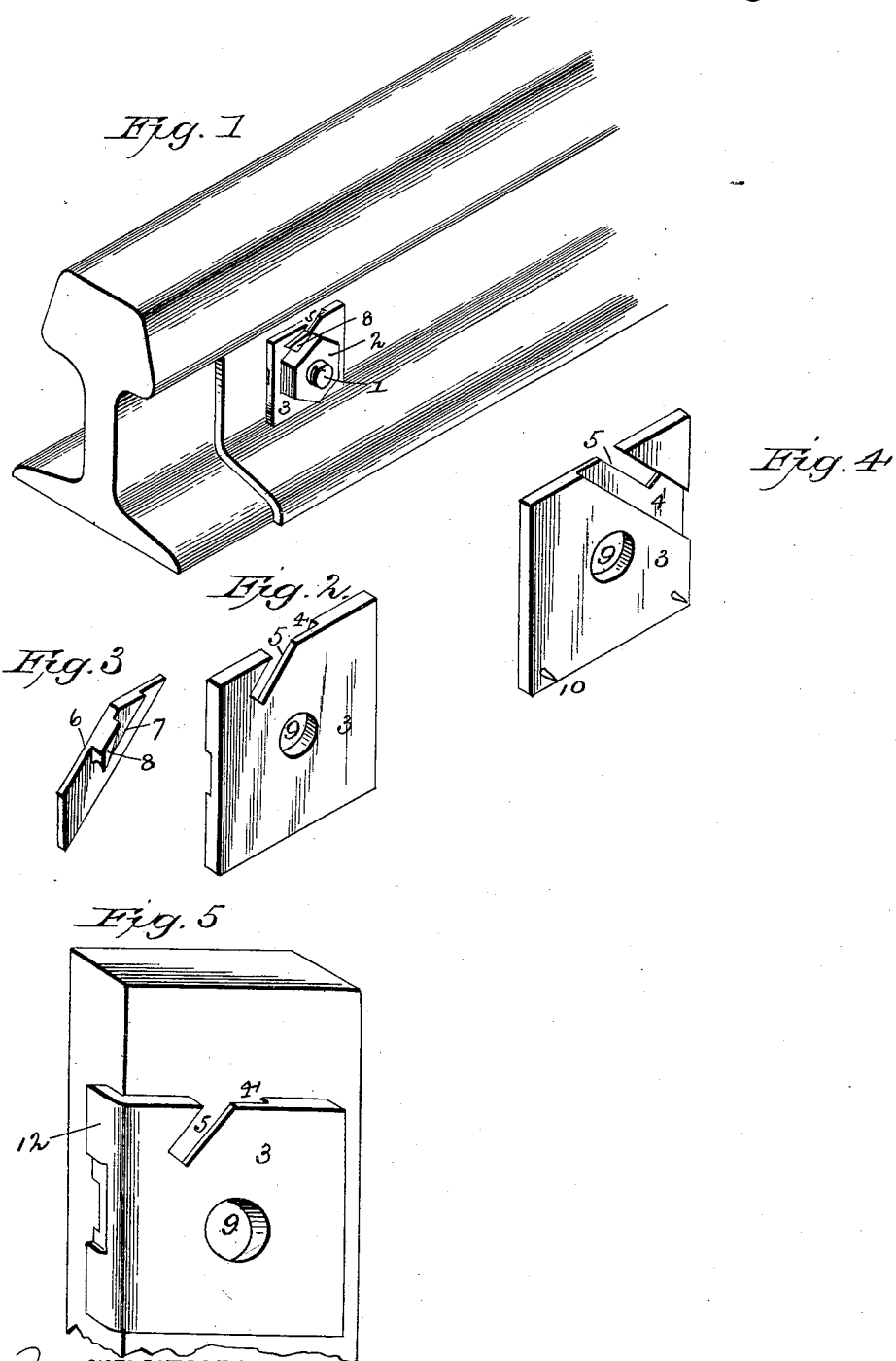
WITNESSES:                    INVENTOR
F. L. Ourand                  James C. McQuilkin,
J. L. Coombs                  by Sauis Gagges &c.
                                     Attorneys.

(No Model.) 2 Sheets—Sheet 2.
J. C. McQUILKIN.
NUT LOCK.
No. 481,417. Patented Aug. 23, 1892.
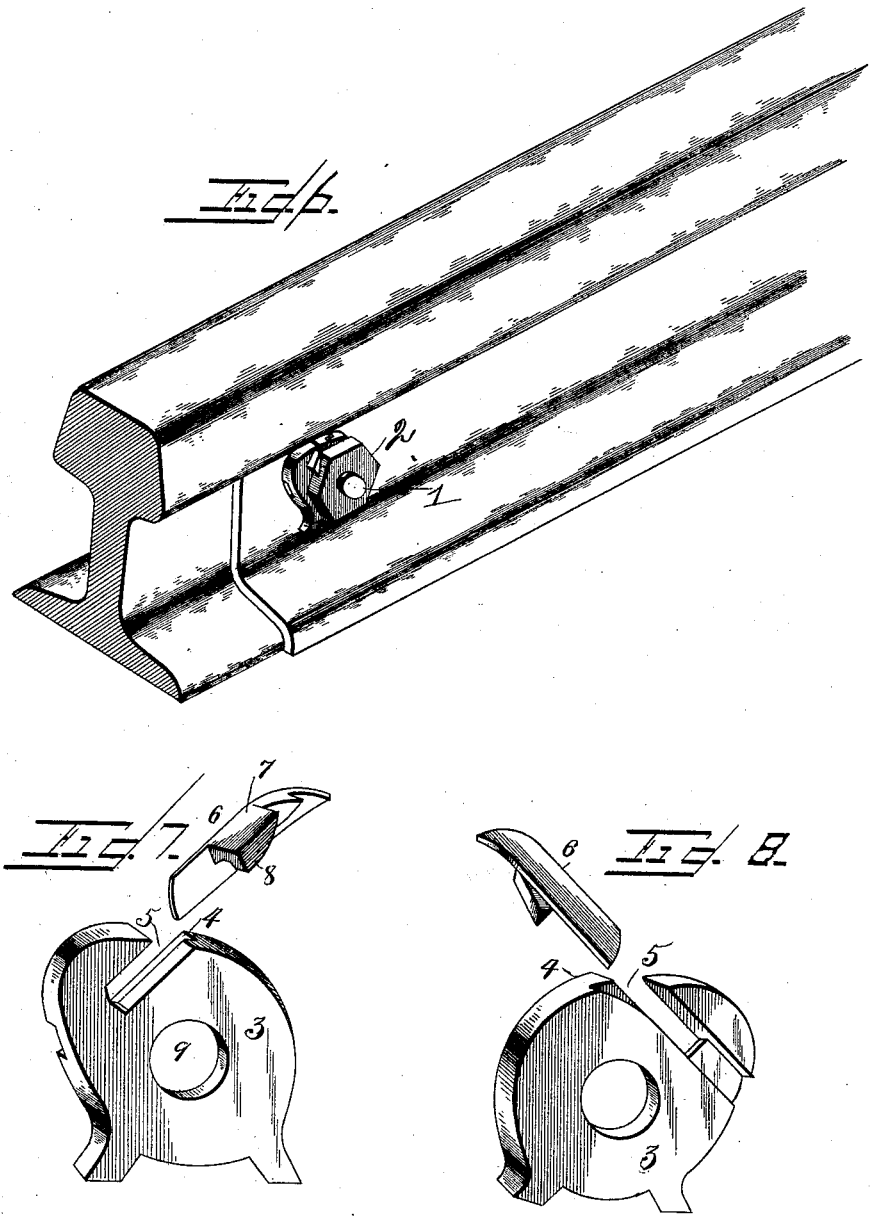
WITNESSES:
F. L. Ourand
Jo. L. Coombs
INVENTOR:
James C. McQuilkin,
by Saml. Digger & Co.
Attorneys.

UNITED STATES PATENT OFFICE.

JAMES C. McQUILKIN, OF INDUSTRY, PENNSYLVANIA.

NUT-LOCK.

SPECIFICATION forming part of Letters Patent No. 481,417, dated August 23, 1892.

Application filed March 31, 1892. Serial No. 427,235. (No model.)

*To all whom it may concern:*

Be it known that I, JAMES C. MCQUILKIN, a citizen of the United States, and a resident of Industry, in the county of Beaver and State of Pennsylvania, have invented certain new and useful Improvements in Nut-Locks; and I do hereby declare that the following is a full, clear, and exact description of the invention, which will enable others skilled in the art to which it appertains to make and use the same, reference being had to the accompanying drawings, which form a part of this specification.

My invention relates to improvements in nut-locks, the object being to provide an improved construction of the same, which shall possess superior advantages with respect to utility and efficiency.

The invention consists in the novel construction and combination of parts hereinafter fully described and claimed.

In the accompanying drawings, Figure 1 is a view showing my improvement applied to a railway-rail. Fig. 2 is a perspective view of the washer. Fig. 3 is a similar view of the securing-key. Fig. 4 is an inner face view of the washer, showing the same provided with a prong or projection. Figs. 5, 6, 7, and 8 are views showing modified constructions.

In the drawings, the reference-numeral 1 denotes a screw-threaded bolt, and 2 an ordinary nut either square, hexagonal, or other shape, adapted to be screwed on the bolt, as usual. The numeral 3 denotes a metallic washer, having upon its inner face a diagonal recess 4 and diagonal slot 5 to receive a key 6, consisting of a metallic plate, having upon its outer face at one end a projecting portion 7, provided or formed at its inner end with a wedge-shaped projection 8. The washer is also provided with a central aperture 9.

When the nut is used in connection with railway-rails, as in Fig. 1, the washer is placed upon the bolt and the nut applied and screwed home, with one of its faces in line with the inner side of the slot 5. The key is now inserted in the recess and the nut turned back, so that it will rest against the wedge-shaped projection. The key cannot now be removed until the nut is turned forward so that its face adjacent to the key is in line with the diagonal slot. The washer is prevented from turning by reason of its upper and lower edges bearing against the head and base, respectively, of the rail.

When the nut is to be used with woodwork, the inner face of the washer is provided with a prong or projection 10, Fig. 4, which is forced into the wood, thereby preventing the washer from turning. In some instances the washer has one of its edges bent at a right angle forming a flange 12, (see Fig. 5,) to engage with the side or edge of a piece of metal, whereby it is prevented from turning.

In Figs. 6, 7, and 8 I have the washer as being somewhat different in form, so as to save material and also to present a neater appearance.

Having thus described my invention, what I claim is—

In a nut-lock, the combination, with a washer having a central aperture, a diagonal recess, and a diagonal slot, of a key adapted to fit in said recess, having a projection at its outer end, adapted to fit in said slot, said projection having a wedge-shaped projection projecting beyond the face of the projection at the outer end and adapted to engage with a nut, substantially as described.

In testimony that I claim the foregoing as my own I have hereunto affixed my signature in presence of two witnesses.

JAMES C. McQUILKIN.

Witnesses:
ALEXANDER T. ANDERSON,
H. D. ANDERSON.